United States Patent [19]

Swain et al.

[11] 3,965,086

[45] *June 22, 1976

[54] PROCESS FOR PRODUCING PROTEIN CONCENTRATE (CASE) 1 USING AIR CLASSIFICATION

[75] Inventors: Ronald Bruce Swain, Walnut Creek, Calif.; David Evans O'Connor, Greenhills, Ohio

[73] Assignee: The Procter & Gamble Company, Cincinnati, Ohio

[*] Notice: The portion of the term of this patent subsequent to July 15, 1992 has been disclaimed.

[22] Filed: Jan. 3, 1975

[21] Appl. No.: 538,280

Related U.S. Application Data

[63] Continuation-in-part of Ser. No. 418,348, Nov. 23, 1973, abandoned, which is a continuation-in-part of Ser. No. 157,052, June 25, 1971, abandoned.

[52] U.S. Cl............................ 260/123.5; 426/312; 426/430; 426/431; 426/463; 426/464; 426/475; 426/484
[51] Int. Cl.² .......................................... A23J 1/14
[58] Field of Search ................................ 260/123.5

[56] References Cited
UNITED STATES PATENTS

| | | | |
|---|---|---|---|
| 2,355,547 | 8/1944 | Musher | 426/567 |
| 2,635,094 | 4/1953 | Belter et al. | 260/123.5 |
| 2,881,076 | 4/1959 | Sair | 426/364 X |
| 3,218,307 | 11/1965 | Eldridge et al. | 260/123.5 |

OTHER PUBLICATIONS

American Miller & Processor, 1960, pp. 11–13, 24, Pfeifereton.

J. Agricultural and Food Chemistry, vol. 11, 1963, Eldridge et al. pp. 323–328.

J. of Amer. Oil Chemists' Society, 1955, pp. 390–397, Teeter et al.

*Primary Examiner*—Howard E. Schain
*Attorney, Agent, or Firm*—Ronald L. Hofer; Louis G. Xiarhos; Richard C. Witte

[57] ABSTRACT

A process for concentrating oilseed protein which comprises the steps of fine grinding and air-classifying the initial protein source and washing the ground protein source with water at a pH of about 4 to 6 or with a 20% to 80% by weight alcohol solution.

16 Claims, No Drawings

PROCESS FOR PRODUCING PROTEIN CONCENTRATE (CASE) 1 USING AIR CLASSIFICATION

CROSS-REFERENCE TO RELATED APPLICATIONS

This application is a continuation-in-part of applicants' copending application, Ser. No. 418,348, filed Nov. 23, 1973, which in turn is a continuation-in-part of applicants' application, Ser. No. 157,052, filed on June 25, 1971, both now abandoned.

BACKGROUND OF THE INVENTION

This invention relates to a method of concentrating the protein content of oilseed meal. More specifically, this invention outlines a new method of achieving higher protein concentration from a variety of protein sources derived from oilseed meals.

As the world population increases, the need for protein is becoming more important as a basic nutritional requirement. The requirements for both protein quantity and quality are well known in the animal and human diet field. Oilseed meals have long been known to be a source of nutritional protein materials. For instance, because of its low cost and high nutritional value, especially in essential protein, it is a generally recognized fact that the soybean is one of the best and cheapest sources of food energy in terms of calories per unit cost of production. The greatest obstacle to the general use of soybeans as a source of human food products is the bitter, beany taste and objectionable odor and color of such products when prepared by prior art methods. Another objection to soybeam food products is their poor keeping qualities and their tendency to become rancid in ordinary storage. In spite of these problems the soybeam has been an important source of food to the Asiatic peoples for many centuries.

Cottonseed flour has been used as a food source for a long time. However, its use has been limited because of the chrome color it imparts to the foods to which it is added and the somewhat bitter flavor of the product, attributable to the inactivated gossypol pigment, and had generally been eliminated from consideration as a protein source for high protein foods. However, recent developments, such as the production of a bland light-colored flour from glandless cottonseed and the development of a low cost process for separating gossypol pigments glands from the protein-containing part of the cottonseed, have made it possible for cottonseed protein to be used in high protein foods.

Other oilseed meals such as sunflower, peanut, safflower, sesame, and rapeseed are also becoming commercially important as new methods of propagation and cultivation yield better seed which are available as potential protein sources.

One known method for increasing the protein content of oilseed meals comprises fine grinding and air classification of the oilseed meal. "Fractionating Corn, Sorghum and Soy Flours by Fine Grinding and Air classification", by V. F. Pfeiffer, A. C. Stringfellow, and E. L. Griffin, Jr., *American Miller and Processor*, August 1960, pages 11–13, 24, shows that soy flour can be concentrated to a certain extent by passing it through an air classifier and taking off the fines fraction. Water-washing and alcohol-washing are also known methods for producing protein isolates from oilseed meals. U.S. Pat. No. 2,881,076, "Proteinaceous Soy Composition and Method of Preparing" by Louis Sair, patented Apr. 7, 1959, discloses a process for treating defatted soybean material with water at pH 4.0 to 4.8 to produce a high-yield soy product. "Alcohol Washing of Soybean Protein" by A. C. Eldrige, W. J. Wolf, A. M. Nash, and A. K. Smith, *Agricultural and Food Chemistry*, July-August 1963, pp. 323–328, discloses alcohol washing of soybean protein to increase the concentration and improve the flavor of the protein. These references do not disclose the combination of air classification and water-washing or alcohol-washing to produce a highly concentrated protein product.

It is therefore an object of this invention to produce a highly concentrated protein supplement derived from oilseeds, adaptable for use in food products. Another object of this invention is to provide a procedure for concentrating oilseed protein. Additional objects, not specifically set forth herein, will be readily apparent to those skilled in the art from the detailed description of the invention which follows.

SUMMARY OF THE INVENTION

Briefly stated, in this invention air classification of a finely ground oilseed protein source is combined with water-washing or alcohol-washing of the protein source to produce a protein concentrate or isolate with a higher protein content than could be previously obtained. In a preferred embodiment, the oilseed protein source is finely ground, air classified to produce a mid-fraction, and then washed with water at pH 4 to 6. The protein source alternatively can be washed with a 20% to 80% by weight aqueous alcohol solution.

DETAILED DESCRIPTION OF THE INVENTION

The oilseed protein source for use in this process can be derived from any convenient method or from a commercially available product. For example, soybeans can be solvent extracted in processes described at pages 663 through 713 of *Bailey's Industrial Oil and Fat Products*, 3d Edition (1964), John Wiley & Sons, New York. The residue after the solvent extraction is soy meal suitable for use in this invention. There are many well known methods for obtaining meals from the other oilseed products.

Another source of oilseed protein is liquid classified cottonseed flour, commercially available from Plains Cooperative, Lubbock, Texas. Other convenient sources of oilseed protein such as meals derived from peanut, safflower, sunflower, sesame, or rapeseed can be utilized in the practice of the present invention.

For the purposes of this invention, the term "oilseed meal" is used to refer to the oilseed protein source material. As will hereafter be shown, the process of the present invention is applicable to oilseed protein sources generally, whether the starting material may be otherwise termed a flour, meal or concentrate.

The oilseed meal is subjected to fine grinding, air classification, and washing with either water at pH 4 to 6 or with a 20% to 80% by weight aqueous alcohol solution selected from the group consisting of methanol, ethanol, and isopropanol solutions. The fine grinding and air classification may be carried out either before or after the washing step, but because of the expense of drying the washed meal it is economically preferred that the fine grinding and air classification be carried out before the washing step. The meal may also be ground, air classified, denatured, e.g. heat denatured, and washed in water at a pH of about 7 to produce a protein concentrate. As used herein, denaturation refers to protein precipitation or insolubilization, usually irreversible, caused by heat, ultraviolet light, acids, bases or other denaturing agents. It will be appreciated that any of a variety of known denaturing methods can be suitably employed.

The oilseed meal is finely ground so that 90% of the particles are less than 100 microns in diameter, preferably in an impact mill such as a pin mill or a fluid energy mill. The ground meal is then air classified to produce a fines fraction, containing the finer particles in the ground meal (usually 90% less than 45 microns in diameter), and a coarse fraction, containing the larger particles in the meal. Air classifiers usually involve feeding the particles into a rotor by means of mixing them with an air stream which flows directly through the rotor. The centrifugal force supplied by the rotor moves the coarse particles to the wall of the rotor. The fine particles go through the rotor with the air stream because they have a smaller mass to size ratio. The air flow rate and the rotor speed are important variables which vary depending upon the material being separated and the air classifier being used. For most protein starting materials, the fines fractions will be higher in protein concentration, but if the water or alcohol washing step is performed before air-classification, then the coarse fraction is generally higher in protein concentration. The fine grinding and air-classification may be accomplished by any convenient method. For example, "Fractionating Corn, Sorghum and Soy Flours by Fine Grinding and Air Classification", by V. F. Pfeiffer, A. C. Stringfellow, and E. L. Griffin, Jr., referred to above, discloses one known method for carrying out the fine grinding and air classification. In a preferred embodiment of this invention, the oilseed meal is air classified to produce a mid fraction. Thus, the meal is air classified twice; a 60% to 90% by weight first fines fraction from the first air classification step is removed, air classified a second time, and a 60% to 90% by weight second coarse fraction is removed during the second air classification step. The second coarse fraction is the mid fraction. A mid fraction can also be obtained by taking a 60% to 90% by weight first coarse fraction from the first air classification step, air classifying the first coarse fraction a second time, and taking a 60% to 90% by weight second fines fraction. In this case, second fines fraction is the mid fraction. The mid fraction contains a higher percentage of protein than either of the fractions taken off during the first air classification step.

The water-washing step involves soaking the meal in an aqueous solution. The aqueous solution can comprise water at a pH of about 4 to about 6, or it can comprise a 20% to 80% by weight aqueous alcohol solution selected from the group consisting of methanol, ethanol, and isopropanol solutions. The 4 to 6 pH range of the water wash is important because this is the range at which the major part of the protein is insoluble. Other pH conditions can, however, be employed where the protein matter is otherwise substantially insolubilized, or denatured, as for example, by application of heat or other denaturing agents. The solvent to meal ratio is preferably from 4:1 to 20:1. The solid protein-containing residue can be separated from the liquid supernatant by filtration, centrifugation, or any other convenient method. For soy meal it is preferred that the pH be from 4 to 5 and for cottonseed meal it is preferred that the pH be from 4.5 to 5.5.

The combination of the above-described steps unexpectedly produces protein concentrates which are light-colored, bland in flavor, more concentrated than any previously produced protein concentrates, and which contain a higher percentage of soluble protein than any previously produced concentrates. Unexpectedly, the present invention allows the production of a more highly concentrated protein product than either step, i.e. air classifying or water washing, can produce alone, or than would be predicted if it were assumed that the steps were additive. In other words, the combination of the above-described steps produces an unexpected synergistic effect which is more than merely additive. The examples demonstrate this synergistic effect.

While applicants do not intend to limit the scope of the invention or to be bound by any particular theory, applicants offer the following explanation of the probable theoretical basis upon which the present invention rests. It is theorized that in the two steps of air-classification and water-washing, one of three different possible results could be encountered: (1) The protein matter is selectively shifted into one fraction while the non-protein matter remains distributed as it was in the unclassified meal. If this occurred, then the two steps would be additive. (2) The protein might be selectively shifted into one fraction while the insoluble non-protein matter was also shifted into the same fraction, with the soluble non-protein material being shifted into the other fractions. With this result, the combined process steps would be less than additive because the air-classification would be removing part of the matter that the washing could remove. (3) The protein matter might be selectively shifted into one fraction along with soluble non-protein matter, while the insoluble protein matter was shifted to the other fractions. This result would make the combined effect more than additive, i.e., the two steps would be synergistic. Applicants believe that this latter possibility is what actually occurs in the practice of the present invention. Depending on the starting material used, the insoluble carbohydrates (non-protein matter) are either larger or smaller than the protein matter. They are separated during the air-classification step. Therefore, air-classification produces a high protein content fraction which contains a substantially lower percentage of insoluble carbohydrates and which can be water-washed to remove soluble carbohydrates and produce a protein concentrate with a higher percentage of protein than previous concentrates. It is also significant that after the air-classification step, a higher percentage of non-protein matter may be removed from the high protein fraction than could have been removed from the whole meal.

The protein concentrates produced by the process of this invention can be added as protein supplements to food products. The food products will not be characterized by any off-flavor. Furthermore, since the protein concentrate is more concentrated than previous protein concentrates, less material can be added to the food products to obtain the same protein level. The texture and appearance of the protein-supplemented foods will be better than those of previous protein-supplemented foods because less material that is not naturally present in the food need be added. The fact that the protein concentrates produced by the process of this invention contain a high percentage of soluble protein means that the concentrates can be more easily adapted to various uses than could previous concentrates. For example, the protein concentrated by the process of this invention can be utilized in breakfast cereals, meat products, peanut butter, imitation dairy products, pet foods, or snack foods and the like, as a protein supplement thereto without changing the appetizing appearance or flavor of these food products.

The following examples further illustrate the novel process herein and are intended only to illustrate the invention and not to limit it in any way.

EXAMPLE I

A sample of defatted soy meal was prepared by cracking and dehulling soybeans, flaking, extracting with hexane at 150°F., and air desolventizing at room temperature. The flakes were pin milled so that 90% of the particles were less than 60 microns in diameter using an Alpine Kolloplex 160 mill and the milled sample was air-classified using an Alpine 100 MZR laboratory air-classifier. Four air-classifications, each time removing the fines and reprocessing the coarse fractions, were made to give the five fractions listed below. All four fines fractions had a particle size of 90% less than 40 microns. The air flow rates and rotor speeds for the four air-classifications were as follows: First, 38 cubic meters per hour and 12,000 revolutions per minute; second, 40 cubic meters per hour and 10,000 revolutions per minute; third, 42 cubic meters per hour and 8000 revolutions per minute; and fourth, 44 cubic meters per hour and 6000 revolutions per minute. The percent protein was determined by multiplying the nitrogen content by 6.25.

| Fraction | % Yield | % Protein (6.25N) | % Non-Protein |
|---|---|---|---|
| 1st fines ($F_1$) | 9.1 | 52.1 | 47.9 |
| 2nd fines ($F_2$) | 10.7 | 57.7 | 42.3 |
| 3rd fines ($F_3$) | 18.4 | 59.2 | 40.8 |
| 4th fines ($F_4$) | 20.7 | 56.8 | 43.2 |
| Coarse ($C_4$) | 37.9 | 50.0 | 50.0 |
| Starting soy flour | — | 52.5 | 47.5 |

Each of these air-classified fractions was washed twice at room temperature with pH 4.5 water using a 10:1 water:meal ratio. The washed residue was recovered by centrifuging and was freeze-dried to yield the following:

| Fraction | % Protein (6.25N) | % Non-Protein |
|---|---|---|
| $F_1$ | 68.1 | 31.9 |
| $F_2$ | 76.3 | 23.7 |
| $F_3$ | 75.3 | 24.7 |
| $F_4$ | 75.3 | 24.7 |
| $C_4$ | 61.4 | 38.6 |
| Washed soy flour | 69.5 | 30.5 |

The synergistic effect of this invention is illustrated by closely examining the effects of air-classification and water-washing separately on the meal. The decrease in non-protein matter is evaluated since this is the matter which is sought to be removed from the oilseed meal by the instant process. Taking $F_2$, which has the highest concentration of protein, it can be seen that air-classification alone lowers the non-protein content of the meal 5.2% (the starting soy flour percent non-protein minus the percent non-protein in $F_2$, or 47.5% - 42.3% - 5.2%). That is a reduction of 10.9% based on the concentration of non-protein material in the starting meal (5.2%/47.5% × 100% = 10.9%). Water-washing alone lowers the non-protein content 17% (the percent non-protein in the starting soy flour minus the percent non-protein in the washed soy flour, or 47.5% − 30.5% = 17%), a 35.8% reduction based on the concentration of non-protein material in the starting meal (17%/47.5% × 100% = 35.8%). If the two steps were additive, then performing them sequentially on a single sample could be calculated from the above percent reductions for each individual step. Air-classification results in a 10.9% reduction of the total non-protein material from the starting soy meal resulting in soy meal having a 52.5%/42.3% (52.5% protein material and 42.3% non-protein material and water-washing this air-classified fraction would be expected to yield a 35.8% further reduction in non-protein material, or a 72.8/27.2 cut. Thus, the expected overall reduction for the combination of the separate steps is 42.8% (47.5% − 27.2% = 20.3%, 20.3%/47.5% × 100% = 42.8%) based on the non-protein concentration in the starting soy meal. However, the combination actually lowers the non-protein content 23.8% percentage points (the percent non-protein in the starting soy flour minues the percent non-protein in $F_2$ after washing or 47.5% − 23.7% = 23.8%), a 50% reduction based on the concentration of non-protein material in the starting meal. This is 7.2% more than would be expected if the two steps were merely additive. A 3% decrease in non-protein material concentration is considered to be substantial.

If the air classified meal is heat denatured and washed in water at pH 7, substantially equivalent results are obtained.

EXAMPLE II

Glandless cottonseed meal was prepared from Watson GL-16 whole glandless cottonseed by flaking, defatting with hexane at reflux, and desolventizing at room temperature. The flakes were then pin milled. The pin milled flakes were separated into four fractions using an Alpine 100 MZR laboratory air-classifier, each time removing the fines and reprocessing the coarse fractions. The air flow rates and rotor speed for the four air-classifications were as follows: First, 35 cubic meters per hour and 15,000 revolutions per minute; second, 35 cubic meters per hour and 11,500 revolutions per minute; and third, 35 cubic meters per hour and 10,000 revolutions per minute. The percent protein was determined by multiplying the nigrogen content by 6.25.

| Fraction | % Yield | % Protein (6.25N) | % Non-Protein |
|---|---|---|---|
| 1st fines ($F_1$) | 11.8 | 64 | 36 |
| 2nd fines ($F_2$) | 19.4 | 69 | 31 |
| 3rd fines ($F_3$) | 20.6 | 66 | 34 |
| Coarse ($C_3$) | 48.1 | 49 | 51 |
| Starting flour | — | 60 | 40 |

These fractions were each washed twice at room temperature with water at pH 5.0 using a 10:1 water:meal ratio. The residues were recovered by centrifugation and freeze-dried to yield:

| Fraction | % Protein (6.25N) | % Non-Protein |
|---|---|---|
| $F_1$ | 81.2 | 18.8 |
| $F_2$ | 86.6 | 13.4 |
| $F_3$ | 83.3 | 16.7 |
| $C_3$ | 63.6 | 36.4 |
| Cottonseed flour | 76.1 | 23.9 |

The synergistic effect of this invention is illustrated by closely examining $F_2$, the fraction containing the highest final protein concentration. The decrease in non-protein matter is evaluated since this is the matter which is sought to be removed from the oilseed meal by the instant process. Air classification alone lowers the non-protein content 9% (the percent non-protein in the starting flour minus the present non-protein in $F_2$), a reduction of 22.5% based on the concentration of non-protein material in the starting meal. Water-washing alone lowered the concentration of non-protein material 16.1% (the percent non-protein in the starting flour minus the percent non-protein in the washed flour), a 40.3% reduction. If the steps were additive, then performing them sequentially on a single sample could be calculated from the above percent reductions for each individual step. Air-classification results in a 22.5% reduction of the total non-protein material from the starting cottonseed material resulting in cottonseed material having 69/31 cut (69% protein material and 31% non-protein material) and water-washing this air-classified fraction would be expected to yield a 40.3% further reduction in non-protein material, or an 81.5/18.5 cut. Thus the expected overall reduction for the combination of the separate steps is 53.8% based on the concentration of non-protein material in the starting cottonseed flour. However, the combination actually lowers the non-protein material concentration 26.6% (the percent non-protein in the starting flour minus the percent non-protein in $F_2$ after washing), a 66.5% reduction which is 12.7% more than additive.

EXAMPLE III

A soy concentrate was prepared from a low temperature desolventized soy meal by water washing at pH 4.5. The meal was washed with 10 parts water, separated from the supernatant by centrifuging, washed again with 6 parts water, separated from the supernatant, and freeze dried. The dried residue was impact milled twice with an Alpine Kolloplex 160 Z pin mill so that 90% of the particles were less than 32 microns in diameter. The milled residue was air-classified with an Alpine 100 MZR Zig Zag laboratory air-classifier at an airflow rate of 42 cubic meters per hour and a rotor speed of 15,000 revolutions per minute to give a fines fraction ($F_1$) and a coarse fraction ($C_1$). The coarse fraction ($C_1$) was air-classified again (42 cubic meters per minute and 10,000 revolutions per minute) at a more coarse cut point to give another fine fraction ($F_2$) and another coarse fraction ($C_2$). This coarse fraction ($C_2$) was air-classified again (39 cubic meters per hour and 6000 revolutions per minute) at an even more coarse cut point to give a third fine fraction ($F_3$) and a third coarse fraction ($C_3$). The second and third fine fractions ($F_2$ and $F_3$) were actually mid fractions of the milled residue. The results are presented below:

| Fraction | Yield, Percent | % Protein (N,6.25) | % Non-Protein Material |
|---|---|---|---|
| Soy meal | — | 55.5 | 44.5 |
| Residue from washing step | — | 69.8 | 30.2 |
| $F_1$ | 14.2 | 47.9 | 52.1 |
| $F_2$ | 13.0 | 58.3 | 41.7 |
| $F_3$ | 29.5 | 74.5 | 25.5 |
| $C_3$ | 43.0 | 77.4 | 22.6 |

The synergistic effect of this invention is illustrated by closely examining $C_3$, the fraction containing the highest final protein content. The decrease in non-protein matter is evaluated since this is the matter which is sought to be removed from the oilseed material by the instant process. When the water-washing step is carried out before the air classification step, the coarse fractions contain more protein than the fines fractions. Water-washing soy meal lowers the non-protein content 14.3% (the percent non-protein in the starting meal minus the percent non-protein in it after it is washed), a 32.1% reduction. The air classified fraction in Example I that yielded the most concentrated protein, $F_3$, lowered the non-protein content 6.7% (the percent non-protein in the starting meal minus the percent non-protein in Example I's $F_3$ or 47.5% − 48.8% = 6.7%), a 14.1% reduction (the $F_3$ fraction, from Example I, can be fairly compared to $C_3$ in this example because the soy meals were similarly produced and because $F_3$ was a lower yield fraction than $C_3$, and lower yield fractions generally contain a higher concentration of protein). If the two steps were additive, then performing them sequentially on a single sample could be calculated from the above percent reductions for each individual step. Water-washing results in a 32.1% decrease in non-protein material from the starting soy material resulting in soy material having a 69.8/30.2 cut (69.8% protein material and 30.2% non-protein material) and fine grinding and air-classifying this water-washed fraction would be expected to yield a 14.1% further reduction in non-protein material, or a 74.1/25.9 cut. Thus, the expected overall reduction for the combination of the separate steps is 41.8% (44.5%−25.9% = 18.6%, 18.6%/44.5% × 100% = 41.8%) based on the non-protein concentration in the starting soy meal. However, the non-protein content is reduced 21.9% (the percent non-protein in the starting meal minute the % non-protein in $C_3$), a 49.2% reduction based on the concentration of non-protein material in the starting meal, which shows that the combination of the two steps is actually 7.1% more than additive.

EXAMPLE IV

A commercially available soy meal, "Brewers Flakes" from Central Soya, that had been desolventized at a low temperature was impact milled twice in an Alpine 250 Z Kolloplex pin mill. Eighty-seven pounds of the milled soy meal was air classified with an Alpine 400 MPVJ air-classifier at a rotor speed of 3300 revolutions per minute and a break ring setting of 9. The fines fraction was then air-classified again at the same conditions. A second fines fraction (49.8% of the feed) was taken off. Twenty-five pounds of the second fines fraction was washed at pH 4.5 with 250 pounds water. The residue was separated from the supernatant by centrifuging. The residue was washed again with 150 pounds water and separated again by centrifuging. The residue was freeze dried. The weight of the dried residue was about 12.7 pounds. The protein contents for each step are listed below:

| Fraction | % Protein (N₂X 6.25) | % Non-Protein Material Removed |
|---|---|---|
| Soy meal | 57.3 | — |
| Second fines fraction | 58.5 | 2.1 |
| Residue after washing | 77.2 | 55.0 |

EXAMPLE V

A sample of liquid-classified cottonseed meal was obtained commercially from Plains Cooperative in Lubbock, Texas. This material was jet milled in a Gem Fluid Energy Mill, manufactured by Frost Jet Mill Division of George W. Helme, Co. Inc. The milled cottonseed meal was air-classified into two fractions in a Multiplex Zig Zag Classifier 100 MZR, distributed by Alpine American Corp. such that the coarse fraction contained twice the amount by weight of the milled meal. The data below reflects the cottonseed meal after air-classification:

| Meal Fraction | % Yield | % Protein (6.25N) | % Non-Protein |
|---|---|---|---|
| Whole meal | — | 68 | 32 |
| Coarse | 66 | 77 | 23 |
| Fine | 34 | 60 | 40 |

Both of the air-classified fractions were washed twice at room temperature with pH 5.0 water using a 10:1 water:meal ratio. The solid residue was recovered by centrifuging and freeze-drying to produce the following yields:

| Meal Fraction | % Yield | % Protein (6.25N) | % Non-Protein |
|---|---|---|---|
| Whole meal | 58 | 86 | 14 |
| Coarse | 55 | 96 | 4 |
| Fine | 58 | 74 | 26 |

Again, the synergistic effect of the invention is illustrated by examining the effects of air-classification and water-washing on the liquid-classified cottonseed meal.

If the two steps were merely additive, the increase in concentration of the protein material (or the corresponding decrease of the non-protein material) could be found by calculating the change in the protein concentration for each concentration step and merely adding them. The decrease in non-protein material is evaluated since this is the matter which is sought to be removed from the oilseed material by the instant process. Using the same method of calcuulation previously employed in Examples 1–3, this yields the following: For the air-classification step, the reduction in non-protein material is found by taking 32% (percent non-protein in the starting material) minus 23% (percent non-protein in the air-classified coarse fraction) = 9% absolute, or 28.1% based on the concentration of non-protein matter in the starting material (9%/32% × 100% = 28.1%). For the decrease in non-protein material resulting from the water washing step, 32% (percent non-protein in the starting material) minus 14% (percent non-protein in the whole meal after water-washing) = 18% absolute, or 56.3% based on the concentration of non-protein material (18%/32% × 100% = 56.3%). If the two steps were additive, then performing them sequentially on a single sample could be calculated from the above percent reductions for each individual step. Since air-classification results in a 28.1% reduction of the total non-protein material resulting in a cottonseed material having a 77/23 cut (77% protein material and 23% non-protein material) and water-washing this air-classified fraction would be expected to yield a 56.3% further reduction in non-protein material, or a 90/10 cut. Thus, the expected overall reduction for the combination of the separate steps is 68.8% (32%−10% = 22%, 22%/32% × 100% = 68.8%) based on the non-protein concentration in the starting cottonseed material.

However, the actual percentage decrease in non-protein matter is in excess of the result expected by the steps being merely additive. Numerically, an actual result of 87.5% decrease in non-protein material is achieved as follows: 32% (percent non-protein in the starting material) minus 4% (percent non-protein in the milled, air-classified and water-washed meal) = 28% absolute, or 87.5% based on the initial concentration of non-protein matter in the starting meal. This is 18.7% over the decrease expected if the results of the two steps were additive.

EXAMPLE VI

A sample of standard high yield sesame meal was pin milled using an Alpine Augsburg Type 63C pin miller at a rate of 25,000 V/m. The milled sample was then air-classified using an Alpine MZR 100 laboratory air-classifier. Two air-classifications were made on the milled sample. The first classification produced a coarse and a fine fraction ($C_1$ and $F_1$) of the meal. The second air-classification was performed on the coarse fraction of the first air-classification cut and produced second coarse and fine ($C_2$ and $F_2$) fractions. The air flow rate and rotor speeds for the two air-classifications are as follows: First classification, 31 cubic meters per hour and 9,500 revolutions per minute; second classification, 33 cubic meters per hour and 7,000 revolutions per minute. The results are shown below with the percent protein being determined by multiplying the nitrogen content by 6.25:

| Meal Fraction | % Yield | % Protein (6.25N) |
|---|---|---|
| Whole meal | — | 62.0 |
| $F_1$ | 41 | 71.8 |
| $F_2$ | 16 | 69.8 |
| $C_2$ | 42 | 53.8 |

Each of these air-classified fractions were washed twice at room temperature with pH 4.5 water using a 10:1 water:meal ratio. The washed residue was recovered by centrifuging and freeze-drying to produce the following yields:

| Meal Fraction | % Weight Recovered | % Protein (6.25N) |
|---|---|---|
| Whole meal | 67 | 67.3 |
| $F_1$ | 77 | 87.2 |
| $F_2$ | 78 | 79.1 |

| Meal Fraction | % Weight Recovered | % Protein (6.25N) |
|---|---|---|
| C₂ | 78 | 57.7 |

The synergistic effect of this invention is illustrated by closely examining the effects of air-classification and water-washing on the sesame meal.

If the two steps were merely additive, the degree of protein concentration could be found by calculating the degree of protein concentration resulting from the separate steps and merely adding them. This is done as follows:

The percentage increase of the protein component of the air-classified sesame meal is calculated by subtracting the percent protein material in the starting sesame meal from the percent protein material in an air-classified sample (71.8 − 62.0 = 9.8 for the $F_1$ fraction, for example). This is a 15.8% increase in protein matter based on the concentration of the protein material in the starting sesame meal (9.8%/62.0% × 100% = 15.8%).

The percentage increase of the protein component in the washing step can likewise be found by subtracting the % protein in the same meal starting material from the % protein of the water-washed whole meal (67.3 − 62.0 = 5.3). This is an increase of 8.5% in protein material based on the concentration of protein material in the starting sesame meal (5.3%/62.0% × 100% = 8.5%). If the two concentration steps are merely additive, then the final product would have a 24.3% (15.8% + 8.5% = 24.3%) increase in the protein material based on the concentration of the protein material in the starting sesame meal.

But surprisingly, the % increase in protein material is more than additive when the two steps are performed in succession on the sesame meal. Using $F_1$, for example, the % increase of protein material can be calculated in the manner used to find the increase for each separate step; that is the % protein in the starting sesame meal is subtracted from the % protein material in the air-classified and water-washed fraction (87.2 − 62.0 = 25.2 for the $F_1$ fraction). This gives an increase of 40.16% in the protein material based on the concentration of protein material in the starting sesame meal, (25.2%/62.0% × 100% = 40.6%), rather than the expected 24.3%. The difference, 16.3%, is the extent of synergism achieved by performing the two protein concentration steps in succession on the sesame meal. A 1% to 3% increase in protein material concentration is considered to be significant.

While this invention has been described and exemplified in terms of its preferred embodiments, those skilled in the art will appreciate that modifications can be made without departing from the spirit and scope of the invention.

What is claimed is:

1. A process for producing a protein concentrate which comprises the steps of:
   a. fine grinding an oilseed meal so that 90% of the particles obtained thereby are less than 100 microns in diameter and air-classifying the resulting ground meal into a fraction which is characterized by its relatively high protein content and relatively low water-insoluble carbohydrate content; and
   b. washing said fraction either in water or in a 20% to 80% by weight aqueous alcohol solution wherein the alcohol component of said solution is selected from the group consisting of methanol, ethanol, and isopropanol and separating the protein containing residue from the liquid supernatant.

2. The process of claim 1 wherein subsequent to the grinding and air-classifying step and prior to the washing step there is inserted a heat-denaturing step such that the protein component of said air-classified fraction is substantially insoluble in water at a pH of about 7.

3. The process of claim 1 wherein the oilseed meal is selected from the group consisting of soy, cottonseed, sunflower, peanut, safflower, rapeseed, or sesame seed meals.

4. The process of claim 1 wherein the meal is washed in water at a pH of about 4 to about 6.

5. The process of claim 1 wherein the oilseed meal is soy meal and said meal is water-washed at a pH of about 4 to about 5.

6. The process of claim 1 wherein the oilseed meal is cottonseed and said meal is water-washed at a pH of about 4.5 to about 5.5.

7. The process of claim 1 wherein the oilseed meal is finely ground such that 90% of the particles obtained thereby are less than 60 microns in diameter.

8. The process of producing a protein concentrate which comprises the steps of:
   a. fine grinding an oilseed meal so that 90% of the particles obtained thereby are less than 60 microns in diameter and air-classifying the resulting ground meal into at least two fractions of which at least one fraction is characterized by its relatively high protein content and relatively low water-insoluble carbohydrate content;
   b. washing said fraction either in water or in a 20% to 80% by weight aqueous alcohol solution; and
   c. separating the protein containing residue from the liquid supernatant.

9. The process of claim 8 wherein subsequent to the grinding and air-classifying step and prior to the washing step there is inserted a heat-denaturing step such that the protein component of said air-classified fraction is substantially insoluble in water at a pH of about 7.

10. The process of claim 8 wherein the oilseed meal is selected from the group consisting of soy, cottonseed, sunflower, peanut, safflower, rapeseed, or sesame seed meals.

11. The process of claim 8 wherein the meal is washed in water at a pH of about 4 to about 6.

12. The process of claim 8 wherein the oilseed meal is soy meal and said meal is water-washed at a pH of about 4 to about 5.

13. The process of claim 8 wherein the oilseed meal is cottonseed and said meal is water-washed at a pH of about 4.5 to about 5.5.

14. The process of claim 8 wherein the alcohol component of the aqueous alcohol washing step is selected from the group consisting of methanol, ethanol, and isopropanol.

15. The process for concentrating the protein material of an oilseed meal which comprises the steps of:
   a. washing said meal either in water or in a 20% to 80% by weight aqueous alcohol solution;
   b. separating the insoluble portion of said washed meal from the liquid supernatant;

c. drying the insoluble portion of said washed meal;
d. fine grinding the insoluble portion of said oilseed meal so that 90% of the particles obtained thereby are less than 60 microns in diameter and air-classifying the resulting ground meal into at least two fractions of which at least one fraction is characterized by its relatively high protein content and relatively low water-insoluble carbohydrate content.

16. The process of claim 12 wherein the alcohol component in the water-washing step is selected from the group consisting of methanol, ethanol, and isopropanol.

* * * * *